Aug. 24, 1954   F. F. RADFORD ET AL   2,687,312
TOW COUPLER
Filed Aug. 3, 1951
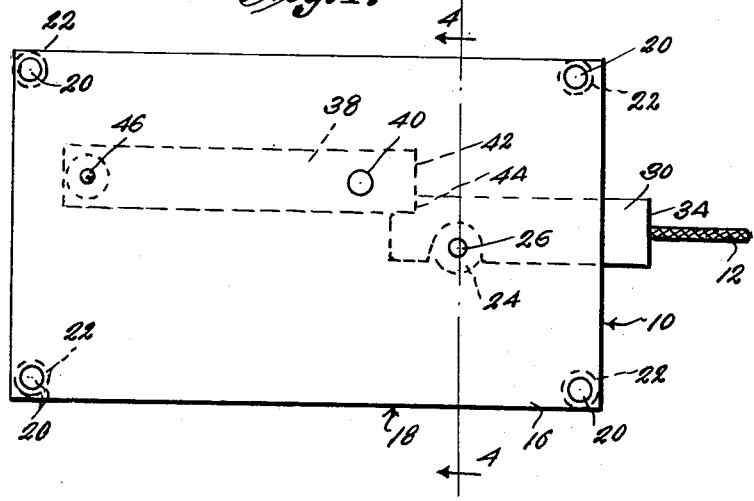
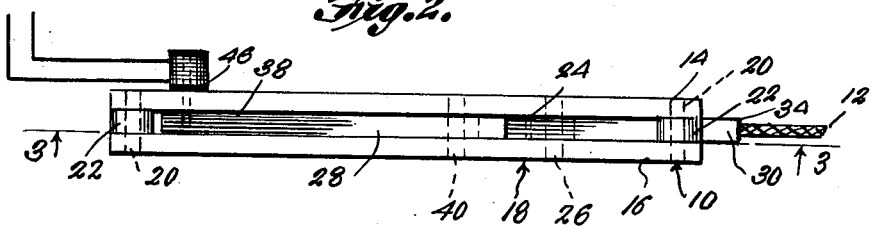
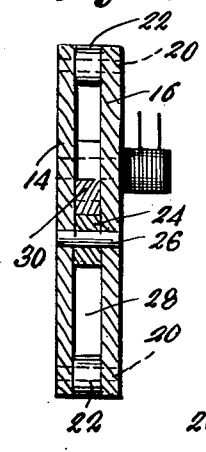
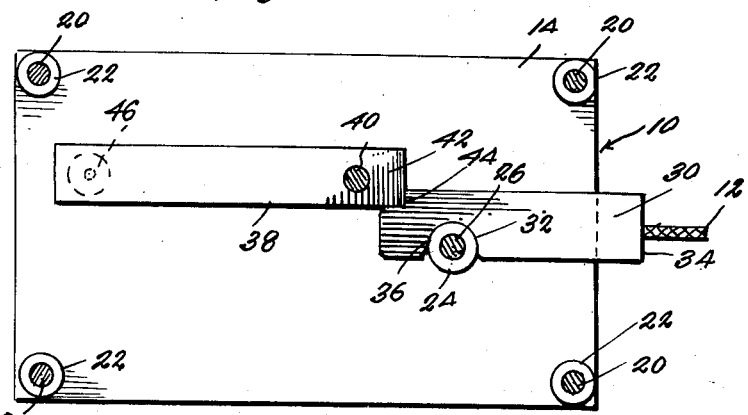
INVENTORS
FLOYD F. RADFORD
BY IRVIN R. BABER
Patrick D. Beavers
ATTORNEY Patented Aug. 24, 1954

2,687,312

UNITED STATES PATENT OFFICE 2,687,312

TOW COUPLER

Floyd F. Radford and Irvin R. Baber,
Miller School, Va.

Application August 3, 1951, Serial No. 240,258

1 Claim. (Cl. 280—504)

This invention appertains to improvements in tow couplers and especially relates to an improved releasable coupler for connecting the tow cables of devices such as target sleeves, gliders and the like to towing aircraft.

The primary object of this invention is to provide a releasable connector or coupler which instantly and positively releases a towed object from a towing vehicle and which, until actuated for release, maintains the towed object in secured attachment to the towing vehicle.

Another object of this invention is to provide a connecting member, which is affixed to the tow cable, and to provide a swingable locking member for normally retaining the connecting member in engagement with a latch, the locking member being restrained from swinging movement by a mechanical or electrical locking means and enabling, upon effecting a swinging movement, the connecting member to release itself, under the weight of the towed load, from the latch.

A further object of this invention is to provide means for effecting an engagement between the connecting member and the latch, which means insures a secure engagement with various sizes and weights of towed objects and with a similar retaining pressure exerted by the locking member.

These and ancillary objects and structural features of merit are attained by the invention, the preferred embodiment of which is set forth in the following description and illustrated in the accompanying drawing, wherein:

Figure 1 is a side elevational view of a tow coupler, constructed in accordance with this invention;

Figure 2 is a top plan view;

Figure 3 is a longitudinal sectional view taken on line 3—3 of Figure 2, and,

Figure 4 is a cross sectional view taken on line 4—4 of Figure 1.

Referring now more particularly to the accompanying drawing, the tow coupler 10 is especially designed for use in releasably connecting a towed object (not shown) by means of a tow cable 12 to an aircraft (not shown) or similar towing vehicle. Of course, the coupler is not restricted in use with a tow cable for towed objects and can be effectively employed as a coupler for allied or dissimilar uses.

The coupler 10 includes a pair of coextensive confronting plates 14 and 16, which form a housing 18 and which are connected by pins 20 and retained in spaced relation by spacer sleeves 22 circumposed on the intermediate portions of the pins and positioned between the plates. A roller 24, which forms a latch, is rotatably circumposed on a pin 26, which is fixed transversely in the plates, the roller being disposed in the space 28 between the plates.

A connecting member 30 is provided and is connected at one end to the cable 12, the connecting member extending rearwardly from the plates and being positioned for movement from the plates within the space 28. A notch 32 is formed on one side edge of the connecting member, which is rectangular in cross section and has the cable suitably anchored in its rearward end 34. The notch is complemental to the roller and is semi-circular to engage the upper portion of the roller. The forward side wall 36 of the notch is formed to lie in the same circle with the rearward wall thereof and in various degrees to a point where it is rectilinear, the formation of the wall, which locks the connecting member on the roller in opposition to the weight of the load on the cable, being dictated by the load and by the desired release time of the load.

A locking member 38 is pivoted on a transverse pin 40 for swinging movement between the plates, the pin passing through the rearward end of the locking member. The rearward end 42 of the locking member is adapted to engage in a seat 44 formed in the forward end of the connecting member on the edge thereof opposite the notch 32, so that the locking member retains the connecting member on the roller 24.

Means is provided for retaining the locking member in a parallel engaging position relative to the connecting member and includes a pin 46, which is disposed through suitable registerable openings in one of the plates and the locking member. The pin 46 can either be actuated to a locking or released position by a mechanical means or may be operated by a solenoid by connecting it to the plunger thereof.

Of course, the housing 18 is suitably affixed to the towing vehicle, such as an aircraft, and when the pin 46 constrains the locking member 38 from swinging movement, the locking member holds the connecting member in engagement with the roller. However, upon removal of the pin 46, the connecting member is free to move outwardly from the housing under the weight of the load, the forward wall of the notch riding over the roller. Thus, it can be seen that the angle of the forward wall relative to the web of the notch will be determinative of the time required for the connecting member to release itself from the latch.

Having thus described this invention, what is claimed is:

A device of the character described comprising a pair of interconnected spaced parallel plates, a latch pin interiorly interconnecting said plates, a roller encircling said latch pin between said plates, a connecting member extending between said plates and having a rounded notch in one side of the inner portion thereof for receiving said roller therein, a tow cable affixed to the outer end of said connecting member, a pivot pin interconnecting said plates, an elongated locking member mounted between said plates and having its inner portion pivotally mounted upon said pivot pin, said connecting member having a seat formed therein in that inner corner thereof opposite to that side thereof containing said notch, and a retainer pin extending slidably and removably through said plates and the outer portion of said locking member.

References Cited in the file of this patent

UNITED STATES PATENTS

| Number | Name | Date |
|---|---|---|
| 28,623 | Williams | June 5, 1860 |
| 565,701 | Bernard | Aug. 11, 1896 |
| 854,196 | Brown | May 21, 1907 |
| 1,189,981 | McKay | July 4, 1916 |
| 1,246,666 | Sherman | Nov. 13, 1917 |
| 1,408,501 | Clement | Mar. 7, 1922 |
| 1,465,168 | Morris | Aug. 14, 1923 |
| 2,248,005 | Lyman | July 1, 1941 |
| 2,556,117 | Smith et al. | June 5, 1951 |